Dec. 19, 1939.  O. M. BURKHARDT  2,183,668
AUTOMATIC ADJUSTMENT MEANS
Filed July 5, 1935  2 Sheets-Sheet 2

INVENTOR
Otto M. Burkhardt,
BY
Justin W. Machlin
ATTORNEY

Patented Dec. 19, 1939

2,183,668

UNITED STATES PATENT OFFICE 2,183,668

AUTOMATIC ADJUSTMENT MEANS

Otto M. Burkhardt, Euclid, Ohio

Application July 5, 1935, Serial No. 29,804

5 Claims. (Cl. 192—111)

This invention relates to means for adjusting slack, or, in other words, for effecting take-up in connecting or operating linkages for mechanisms, such, for example, as in motor vehicle clutches and brakes. Numerous other uses of analogous nature may be made of the present invention.

Surface friction is used extensively for purposes of driving machinery and of stopping it. An outstanding disadvantage of friction surfaces as commonly applied is that they wear.

Such friction surfaces are usually operated (applied and released) through linkages that have a limited amount of motion. Consequently, after some wear of the friction surfaces has taken place, this linkage has to be adjusted in order to bring it into a position necessary for effective actuation of these friction surfaces. In some cases, lost motion must be provided in the linkage to permit full engagement because of wear, while in other cases, lost motion develops in the linkage as wear progresses.

The object of this invention is to overcome the need for periodic manual adjustments and to remove lost motion out of the operating means or linkage actuating such friction mechanisms, by incorporating into such linkage a suitable, efficient and reliable automatic adjustment.

Other objects of my invention include simplicity of manufacture, durability in use and a reduction of effort required to operate friction mechanisms. More specific objects will become apparent in connection with the following specification which illustrates an embodiment of my invention applied to an automobile friction clutch.

In the drawings, Fig. 1 is a vertical axial section through a friction clutch mechanism embodying my invention;

Figure 2:
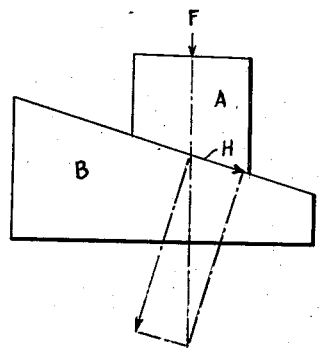
Fig. 2 is a diagrammatic illustration of a primitive wedge action.

The invention is based on a physical phenomenon which, while perhaps not generally known, can easily be demonstrated. In Fig. 2 body A rests through its flat surface upon the flat surface of another body B, which may be called a wedge. The contact surfaces of the two bodies are inclined an amount so chosen that the friction between the two surfaces normally holds the two bodies from sliding relative to each other.

If a force F is applied to body A, this force imparts itself to wedge B perpendicular to the contact surfaces, and yields a component H acting parallel to the contact surfaces. Surfaces as normally produced in a machine shop are not absolutely smooth, and when two such surfaces come in contact, only a few high spots come first in contact. These high spots compress until the elastic stresses so aroused balance the applied load.

If the force F is suddenly stopped from acting on wedge B, the elastic stresses just spoken of separate the two surfaces in contact and so diminish the friction, whereupon body A in seeking a new equilibrium also seeks a lower level. By repeatedly tapping wedge B, it will be noted that body A moves down the incline of wedge B.

If by an abutment the body A is prevented from sliding down the incline, then wedge B will by repeated tapping gradually move out from under body A because on a disturbed balance body A will seek the lowest level.

Figure 3:
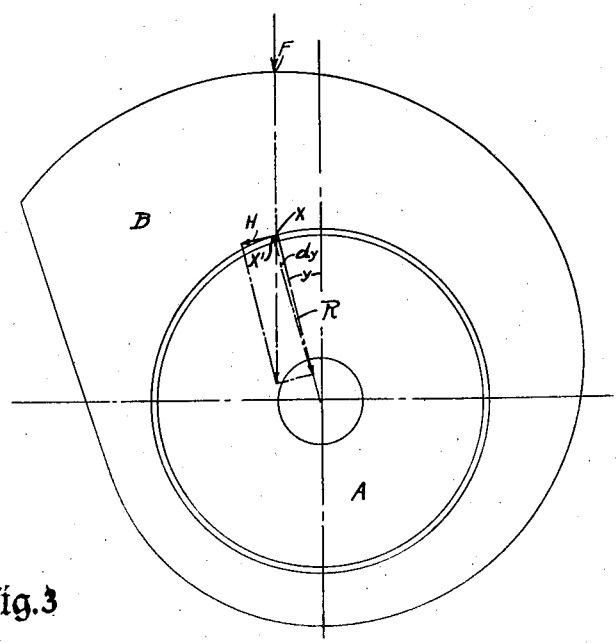
Fig. 3 is a diagrammatic illustration of a circular wedge mounted on a pivot analogous to the form used in this invention.

Extensive tests have proven that the same phenomenon exists if the wedge B is made of a suitable spiral shape, as shown in Fig. 3. The spiral wedge B is mounted with some clearance upon pivot A. A lubricant fills up the clearance space between the wedge and the pivot. Normally the lubricant will be found to insure an approximately equal clearance distribution around the circumference of pivot A due to capillarity and surface tension. If a pressure F is applied to the periphery of spiral wedge B, it will transmit itself from point X to the film of lubricant and to the circumference of pivot A. The construction is so conceived that force F does not point toward the center of pivot A, and according to certain laws in mechanics may be considered as acting upon the pivot's circumference in two components. The normal component R passes through the center of pivot A and forms from the original position X an angle $y$ with the instantaneous path or line of resistance of pivot A, that is, a line through the bearing axis parallel to the line of action of the applied force F at the instant of application of the force F. The tangential component H is balanced by the friction due to the viscosity of the lubricant. The force F causes the film of lubricant and the high spots on the surface to yield and point X of spiral wedge B moves in direction of force F toward point $X_1$.

It will be observed from the geometry of Fig. 3, that by moving into this new position, the circular wedge is also angularly displaced an amount $dy$ (counter-clockwise) relative to pivot A. A counter-clockwise motion of wedge B relative to pivot A brings the object exerting pressure F on the periphery of the wedge to a lower level.

When pressure F is released, the elastic stresses of the surfaces in contact and the surface tension of the lubricant will reestablish approximately equal clearance around the circumference of pivot A because the surface tension of the lubricant is equally effective from both sides of $X_1$ and the surface stresses act normal to the contact surfaces. Therefore $X_1$ will separate itself radially in direction $y$ plus $dy$ from the line of resistance of the pivot A instead of returning along the path it came, namely, in direction of force F. Hence, one result of the application and release of force F is that spiral wedge B has turned an angle $dy$ relative to pivot A and so established a little clearance at a desired moment, which in the invention is to be utilized in compensating for wear.

Figure 1:
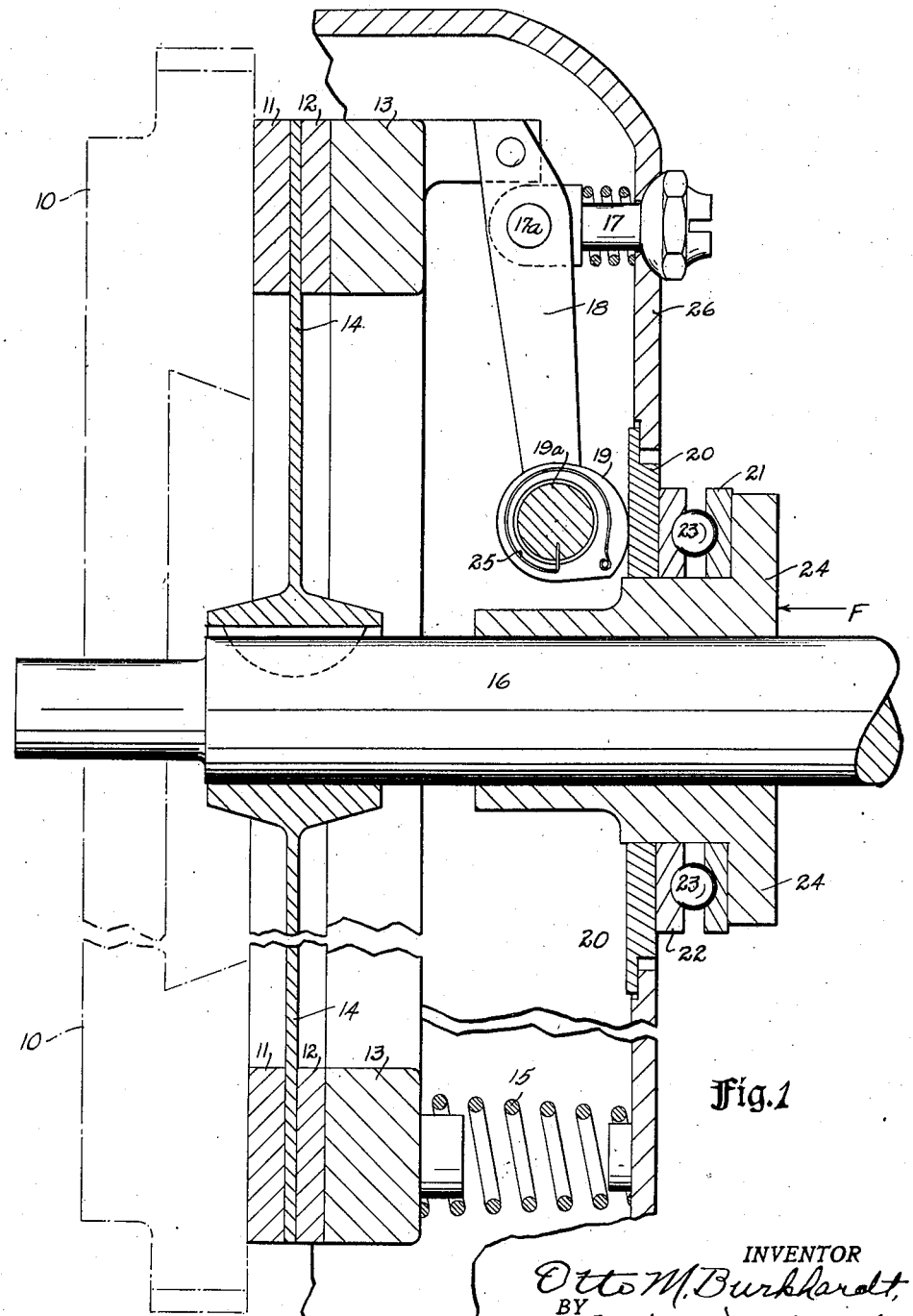

To show how the invention of the automatic adjustment can be built into existing mechanisms that otherwise would require periodic manual adjustment, a conventional motor vehicle clutch mechanism is shown in Fig. 1, illustrating a convenient embodiment of my invention. 10 represents a fly wheel of a prime mover, here shown as the fly wheel of an automobile motor. 11 is the usual friction lining attached to fly wheel 10. 12 is the usual opposed friction lining fastened to a clutch pressure plate. 13 is a clutch pressure plate. 14 designates the clutch disk of conventional construction and which under pressure is frictionally held between the friction linings 11 and 12 when the clutch is engaged and which is free and independent from the friction lining and hence the prime mover if the clutch is disengaged. The disk 14 is shown as suitably keyed to the transmission or driven shaft 16.

A series of springs as at 15 act on the pressure plate 13 and furnish the pressure required to frictionally transmit torque from the fly wheel 10 to disk 14. The driven shaft 16 which transmits the power to the driving wheels is to be either connected or disconnected through the friction clutch as the case requires. 17 is an eye bolt and 17a is a pivot serving as a fixed fulcrum for lever 18. The lever 18 has the end of its short arm anchored to thrust plate 13 and the long end, through the medium of a pivot 19a and a spiral wedge 19, rests against the smaller thrust plate 20. Lever 18, rotatably secured to eye bolt 17, serves to give the commonly used mechanical advantage in disengaging and engaging the clutch. 21 and 22 are thrust races and 23 balls of a conventional thrust bearing. 24 is a thrust sleeve centered and guided on the driven shaft 16. Small thrust plate 23 rests against clutch housing 26 and mainly serves to make the clutch mechanism a self-contained unit.

When the clutch is to be disengaged, thrust F is applied at the thrust sleeve 24, transmitting itself through the thrust bearing to thrust plate 20 and thence to spiral wedge 19, the wedge 19 being mounted with customary clearance on pivot 19a. In taking up the small clearance between 19 and 19a and while pressure F is exerted on the oil film within the clearance and an equalization of elastic stresses is being established, thrust F causes circular wedge 19 to seek a slightly lower level, as previously described in detail. This slightly diminishes the amount of wedge thickness between the center of pivot 19a and the thrust plate 20. While wedge 19 is firmly seated on its pivot 19a, the disengaging and reengaging of the clutch is accomplished exactly as in a conventional clutch system.

When the clutch is re-engaged, some slipping takes place between the friction surfaces 11 and 12 and disk 14. This causes a minute amount of wear; hence lever 18, in order to fully and safely permit the thrust plate 13 to re-engage disk 14, has to swing a minute amount further in engagement than it was swung during disengaging of the clutch. But wedge 19 in seeking a lower level during the disengagement, i. e., because of the lesser amount of wedge thickness between center of pivot 19a and the thrust plate 20, has provided a means for more travel of lever 18 towards the thrust plate 20. The amount is exactly as much or rather more than the wear requires; hence, an unhindered re-engagement of the clutch is assured.

After the clutch is fully re-engaged and nearly all tension from lever 18 has disappeared, clock spring 25, which constantly urges wedge 19 to a higher level, takes effect by urging and consequent movement of spiral wedge 19 so as to take up any slack between lever 18 and thrust plate 20. The amount of slack take-up is reduced by that required for taking up wear.

The above description of operation of the clutch completes one cycle; therefore for each disengagement and engagement of the clutch an adjustment of the clutch is provided as claimed for the invention.

Pivot 17a of lever 18 being fixed, it follows that as the friction faces wear, the long arm of lever 18 must be free to move toward thrust plate 20 if efficient power transmission through the clutch is not to be interfered with. For this reason, conventional clutches require a definite and large lost motion of the linkage between the long end of lever 18 and the thrust plate 20.

The interposing of cam 19 between lever 18 and plate 20 eliminates any lost motion and only provides for each clutch engagement as much freedom for lever 18 as the wear of the friction surfaces require. The result is that the pedal travel in disengaging the driving mechanism from the driven shaft is much less and the required effort thereby is reduced for a clutch being equipped with my invention from that required for a conventional clutch.

It is not to be understood that the specific embodiment of my invention as illustrated in the drawings and as described in the specification is intended to limit the scope of my invention.

Having thus described my invention, what I claim is:

1. In an apparatus employing relatively movable parts and means for frictionally interlocking said parts when the parts are moved to a given position, a movable member operatively associated with said parts for moving the same when the member is moved, a primary moving member for moving the movable member in one direction, means for returning the movable member toward starting position, compensating means operatively interposed between the members for compensating for slackness due to wear occurring among the said parts and members, said compensating means comprising a circular bearing element carried by one member and fixed in position thereon, an abutment element rotatably mounted on said bearing element with slight radial clearance and having a peripheral surface curved at progressively increasing radius about an axis parallel to and offset from, or coincident with, the axis of the bearing element, and positioned for engagement by the other member for applying the motivating force from the primary moving member to the movable member through the abutment along a line falling within the diametric limits of the bearing element and eccentric from the bearing axis at the side of relatively greater radius of the peripheral surface of the abutment element, and parallel to the instantaneous line of resistance of the bearing of the abutment element, and means yieldably urging the abutment to rotate about the bearing in the direction to dispose a portion of the peripheral surface of greater radius into contact with the primary moving member.

2. In an apparatus employing relatively rotatable parts, said parts being movable relatively toward and away from each other, means for frictionally interlocking said parts when said parts are moved to one position, a movable member operatively associated with said parts for moving the same when the member is moved, a primary moving member for moving the movable member, means for returning the movable member toward starting position, wear compensating means operatively interposed between the members for compensating for slackness due to wear occurring among said parts and members, said compensating means comprising an abutment rotatably mounted on one of said members with slight radial clearance with respect thereto, and having a curved peripheral surface of increasing radius of curvature, said surface being positioned for engagement by the other member, the application of force between said members being in eccentric relation to the rotational axis of the abutment, said abutment being movable bodily toward the member on which it is carried by the application of force between the members in a direction substantially parallel to the line of application of said force, said abutment being operative by an oil film between it and the member on which it is carried, upon release of said force between the members to move along a line angularly disposed to said line of application of the force, and into a concentric position with respect to the member on which it is carried, and means yieldably urging said abutment to rotate about its axis in the direction to dispose a portion of the peripheral surface of greater radius into contact with the contacting one of said members.

3. In an apparatus employing relatively rotatable parts, said parts being movable relatively toward and away from each other, means for frictionally interlocking said parts when the parts are moved in one direction, a movable member operatively connected with said parts for moving the same when the member is moved, a primary moving member for moving the movable member in one direction, means for returning the movable member toward starting position, an abutment movably mounted on one of the members and having an operating surface engageable by the other member for transmitting force between the members, said abutment being in a form for presenting a variable dimension in operative position between the members in a line continuous with the direction of movement of the members, means rendered operative consequent upon each application of force between the members for moving the movable member by the primary moving member to temporarily present a different operative dimension of the abutment in one direction parallel to the direction of application of the force, said means further being rendered operative consequent upon each release of the applied force for permanently presenting a different operative dimension of the abutment in the same direction, whereby the dimension is progressively permanently varied in one of said directions, and means for continuously urging the abutment toward the position presenting the greatest dimension between the members.

4. In a clutch mechanism including a pair of coaxial relatively rotatable members having coacting friction clutch surfaces, means supporting the elements for axial movement relatively toward and away from each other, resilient means urging the elements relatively together, means including a lever for moving the elements relatively apart, a prime moving element controllable by an operator for moving the lever, a fixed abutment on the lever, a movable abutment mounted on the fixed abutment and having a surface engaged by the prime moving element for operation of the lever by the prime moving element, means including the configuration of the abutments operative in a manner tending to cause successive slight uniform increments of movement of the movable abutment relative to the fixed abutment irrespective of wear on the friction clutch surfaces upon successive applications and release of the pressure applied by the prime moving element to change very slightly and progressively the relative distance between the instantaneous contacting portion of said surface, with the prime moving element, and the fixed abutment.

5. In a mechanism having relatively rotatable elements relatively movable axially toward and away from each other to effect frictional engagement and disengagement, respectively, and having wearing surfaces, means for moving said elements relatively toward and away from each other, said means including a control lever, a primary moving member movable along a predetermined path at the will of an operator, a self-adjusting abutment means carried by the control lever and interposed between the primary moving member and the control lever, cylindrical bearing surfaces on the self-adjusting abutment and the control lever and having slight radial clearance therebetween, an external peripheral abutting surface on the abutment having a progressively changing radius of curvature, said abutting surface being engageable with the primary moving member at a point so that the line of action of the force applied to the abutting surface does not pass through the axis of the cylindrical bearing member and the cylindrical bearing surfaces on the self-adjusting abutment and the control lever being concurrently engageable at a point in direct alignment with the line of action of the force applied on the abutting surface and the predetermined path of movement of said primary moving member.

OTTO M. BURKHARDT.